June 6, 1961  E. E. AYLOR  2,987,280
ROTOR PROPELLED KITE
Filed May 28, 1956
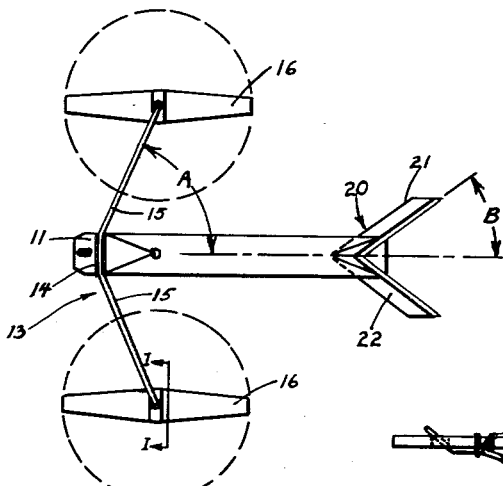
FIG. I
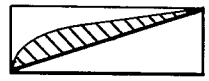
FIG. 5
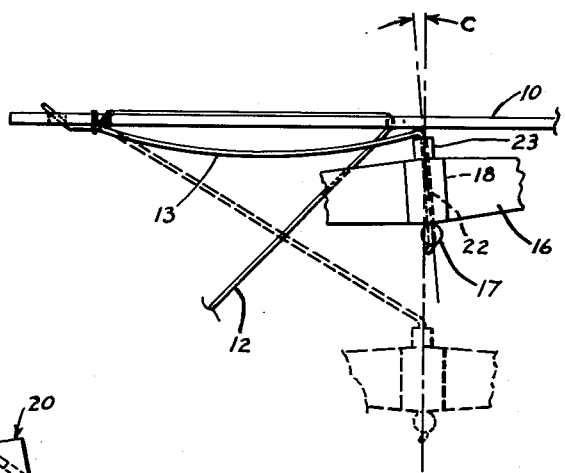
FIG. 4
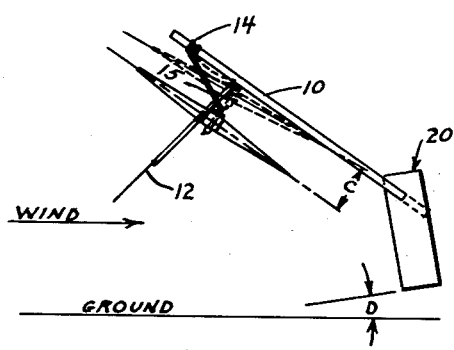
FIG. 2
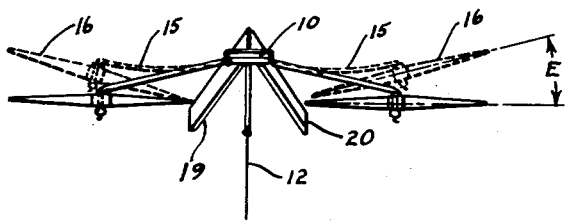
FIG. 3
INVENTOR.
ELMO E. AYLOR
BY *Charles F. Schroeder*

United States Patent Office 2,987,280
Patented June 6, 1961

2,987,280
ROTOR PROPELLED KITE
Elmo E. Aylor, Galesburg, Ill. (21409 Celes St., Woodland Hills, Calif.)
Filed May 28, 1956, Ser. No. 587,573
7 Claims. (Cl. 244—154)

The present invention relates to wind driven flying devices and more particularly to a flying device which has its lift power generated by wind driven rotors.

The invention herein disclosed is related to improvements in wind driven flying devices or kites of the type disclosed in my Patent 2,675,199 issued on April 13, 1954. I have found that by making certain basic changes in the structure of the kites of the above indicated patent, that the stability and ease of flight can be greatly increased to the extent that such kites can now be flown under certain conditions in which heretofore they could not satisfactorily be made to fly. In addition, changes toward structural simplification of such kites can be effected according to the invention to make the kites readily adaptable to more economical construction.

It is an object of the present invention to provide a rotor propelled kite more readily adaptable to self adjustment for stable flight regardless of variations in wind conditions.

It is another object of the present invention to provide a rotor kite having uniform lift characteristics regardless of wind strength.

A still further object of the invention is to provide a rotor propelled kite which adjusts itself automatically for optimum flight characteristics regardless of wind conditions confronted.

In brief the kites of the type described herein are based upon the principle that wind driven rotors supported on outriggers of a kite structure can be made to generate thrust forces capable of lifting the structure into flight. I have found, however, that for each given set of wind conditions, a proper orientation and support of bladed rotors exist for promotion of optimum stable flight conditions. Thus, under conditions of extremely variable winds, a fixed orientation of the lift rotors and a fixed angle of attack of the kite are not conducive to stable or steady flight. For high wind velocity, it is desirable that the angle of attack, and correspondingly the lift forces of the rotors, be reduced in comparison to the corresponding angle of attack and lift forces for low velocity wind. Correspondingly, the tail portion of the kite is desirably aranged to be such that with a high velocity wind it will exert forces to dampen out tendencies toward turbulent or erratic oscillation frequently experienced at the rear portion of the kite. I have been able to overcome the problems so presented by variation of wind velocity by incorporating flexible outriggers in such kites and a tail structure which exerts varying magnitudes of stabilization force dependant on wind conditions confronted.

Other objects and features which I believe to be characteristic of my invention are set forth with particularity in the appended claims. My invention, however, both in organization and the manner of construction together with further objects and advantages thereof may be best understood by reference to the following description taken in connection with the accompanying drawing in which:

FIGURE 1 is a top plan view of a rotor kite of the type embodying the principles of the present invention;

FIGURE 2 is a side elevational view of the kite showing its position relative to level ground while in a flight and showing in dashed lines the degree of flexure of the rotor outrigger support members while in flight in comparison to their normal unflexed position shown in solid lines;

FIGURE 3 is a front elevational view of the rotor kite of FIGURE 1 showing in dashed lines the position of the rotor and outrigger support members when the latter are flexed while in flight;

FIGURE 4 is an enlarged side elevational view of a portion of the kite shown in FIGURE 2 showing part of the body disposed horizontally, with the flight position of an outrigger shown in solid lines flexed from its normal position shown in dashed lines;

FIGURE 5 is a side elevational view in cross section of a rotor blade as taken on line I—I of FIGURE 1.

Referring to the drawings in greater detail, FIGURES 1, 2 and 3 illustrate a fuselage or body 10 comprising a simple, generally straight longitudinal member or frame having a tongue portion 11 at one end having a hole therein through which a tow line fastening may be made, such as by a flexible tow line 12. A stiff but flexible or resilient wire member 13 is fastened to the body 10 near the tongue portion 11 with its ends extending laterally equal distances on either side of the body to form a pair of opposed outriggers or rotor support arms 15 for the kite. Although a single member 13 is herein described, it can be readily understood that a matched pair of resilient members might also be used for this purpose. Each outrigger extension 15 in its normal unflexed form is a generally straight longitudinal portion extending slightly downwardly from the longitudinal axis of the body portion and slightly rearward from its position of attachment to the kite.

The outrigger member 13 may be fastened to the body 10 in any suitable manner which will secure it in place in relatively fixed relation to the body 10, but is preferably fastened by means which may be readily removed when desired. One such fastening means may be a rubber band 14 looped over the body portion and under each outwardly extending portion of the member 13 to secure the outrigger structure to the underpart of the body 10. It is to be understood, however, that many other means are adaptable to providing securement of the outriggers to the body 10.

A pair of lift rotors 16 are mounted each on one of the outward extending outrigger portions 15 of the member 13. This mounting is accomplished by providing a bushing 18 in the center of each of the rotors through which the angularly bent end portion 19 of one of the outrigger extensions 15 is passed. Each angular end portion 19 is long enough to accommodate a thrust bearing 23 at its immediate point of bend, the rotor 16 for the full length of the hub, as well as a spherical retainer bead 17 at the tip. The very tip of each portion 19 is bent over slightly to hold the assembly of the spacer, rotor and bead in place, or alternatively a Tinnerman type fastening means might be secured to the very tip for such fastening purposes.

The bent-over end portion of each of the outrigger extensions 15 is so angularly related to the extension that in normal position without flexing of the extension, the axis of the rotors are generally perpendicular to a plane passing through the body of the kite and parallel to a line passing through the hubs of the rotors. Thus, when the rear portion of the kite is inclined downwardly, or in other words, when the rear is at a lower level than the forward part of the kite, the rotors are correspondingly inclined to the horizontal and will face an oncoming wind.

The dynamics of the flexible outrigger extensions 13 are such that when large lift thrusts are exerted by the rotors 16 under the influence of high velocity winds, the support arms 15 bend in a hinge-like manner about their point of joinder to the body of the kite. Since the thrust of each rotor 16 is exerted at the end of its respective support arm 15, the flexing of the arm about the hinge point is such as to produce a gradual arching of the entire arm with consequent reduction of the angle of attack of the rotors with respect to the oncoming winds. By reason of the flexing of the support arms 15 responsive to exertion of the rotor thrust forces, the angle of attack of the rotors is reduced by the amount of angle C illustrated in FIGURE 2. The changed angle of attack of the rotors is not attributable solely to the distance of movement of the end of the support arm, but in moving, the arms cause their respective rotor axes to tilt slightly from their original orientation and to take on a plane of rotation not as great in angular relation to oncoming winds as that of its original plane of rotation. In this way, the total lift force exerted by the rotors on the kite is reduced with increases in wind velocity and is held closer to a constant figure regardless of wind strength. Unbalancing forces due to sudden gusts of wind are accordingly minimized while conditions of flight with heavy winds are also stable.

As the support arms bend upward with heavy winds, a dihedral angle is generated between the rotor axes (see FIGURE 3). This angle also increases with increased wind velocity which further helps to reduce the effect of lift of the rotors as the wind increases. Additionally, the increased dihedral angle promotes greater stability against lateral unbalance.

As may be seen in FIGURE 2, an oncoming wind will tend to lift the body by exertion of forces along the longitudinal part thereof. It is, therefore, desirable that the tail assembly exert a downward thrust on the portion of the body when the wind velocities are increased. This is accomplished in the present instance by orienting a pair of planar members or vanes 21 and 22 of the tail assembly so that they flare outwardly from a point of joinder above the rear end of the body 10 and angularly downward therefrom. With such an arrangement, an inverted V-shaped structure is formed with an angle B therebetween which in steady winds acts as a wedge to promote directional stability and reduce tendencies for sideward movement of the tail portion. On the other hand, the combination of the outward flare and the downward inclination of the members 21 and 22 also acts to produce a secondary wedging action more clearly discernable in the view of FIGURE 3. The second wedging action results from the oncoming winds being directed against the upper surfaces of members 21 and 22 whereupon a downward thrust is exerted on the tail assembly proportional to the wind velocity. In other words, the outward flare of the vanes from the forward edge of the assembly to the rear edge causes the oncoming winds to exert a downward thrust. This thrust works to oppose the lift forces developed by the winds acting against the under body portion of the kite. The combined upward and downward forces dampen out tendencies toward pitching or oscillation of the rear end of the kite. This feature makes the point of attachment of the tow line 12 near the forward end of the kite less critical relative to the point of resultant lift. In another sense, the inverted V type tail promotes lateral stability as well as longitudinal stability. An upright V with a similar negative angle of lift to produce down thrust is aerodynamically unstable and promotes yawing oscillation about a vertical axis.

While this invention has been shown and described in connection with preferred embodiment thereof, it is apparent that many variations and modifications might be made within the general concepts of the invention and it is contemplated in the appended claims to cover all such variations and modifications as fall within the true spirit and scope thereof.

I claim as my invention:

1. A rotor kite comprising a longitudinal frame comprising a pair of oppositely projecting outriggers secured thereto, each of said outriggers being flexible and having a wind driven rotor rotatably mounted on the underside thereof on a generally downward extending axis, said outriggers each being subject to flexure under the influence of thrust forces of its respective rotor, and being arranged for varying degrees of flexure proportional to thrust forces exerted by said rotors.

2. A rotor kite comprising a longitudinal frame, a pair of oppositely projecting outriggers comprising a resilient member secured to said frame and extending substantially equal distances on both sides thereof, each of said outriggers having a wind driven rotor rotatably mounted on the underside thereof on a generally downward extending axis at the extreme end of each, said outriggers each being flexible for angular flexure under the influence of thrust forces of its respective rotor.

3. A rotor kite comprising a longitudinal frame, a pair of oppositely projecting outriggers secured to the forward portion thereof, each of said outriggers having a wind driven rotor rotatably mounted on the underside thereof on a generally downwardly extending axis, and a stabilizing structure disposed on said frame rearwardly of said outriggers, each of said outriggers extending downwardly and rearwardly with reference to the longitudinal axis of said frame, said outriggers being flexible for resilient movement in an upward direction with reference to said frame upon application of forces directed against and exerted by said rotors in rotation.

4. A rotor kite comprising a longitudinal frame, a pair of oppositely projecting outriggers secured to the forward portion thereof, a pair of rotors rotatably mounted on said outriggers, a stabilizing plane structure disposed on said frame rearwardly of said outriggers, and a connection for securing flexible tow means near the forward portion of said frame, each of said outriggers extending downwardly and rearwardly with reference to the longitudinal axis of said frame, the axis of each of said rotors extending generally downwardly and perpendicular to a plane passing through the axis of said rotors and substantially parallel to said frame, said outriggers, being flexible for bending movement in an upward direction with reference to said frame and being springy or biasing action against such movement.

5. A rotor propelled kite comprising a longitudinal frame, a pair of outriggers extending oppositely from the sides of said frame comprising wire members adapted to flexing, a pair of rotors rotatably mounted on the underside of said outriggers, a stabilizing plane structure disposed on said on said frame rearwardly of said outriggers, and a connection for securing flexible tow means at the forward portion of said frame, each of said outriggers extending slightly downwardly and rearwardly with reference to the longitudinal axis of said frame and being resiliently bendable in an upward direction with reference to said frame upon application of forces directed against and exerted by said rotors in rotation.

6. A rotor supported kite comprising a longitudinal frame, a pair of oppositely projecting outriggers secured to the forward portion thereof, a pair of rotors rotatably mounted on the underside of said outriggers, a connection for securing flexible tow means at the forward portion of said frame, a stabilizing plane structure disposed on said frame rearwardly of said outriggers comprising a pair of oppositely extending flat planar members extending angularly downward, outward and rearward from a line of intersection angularly inclined to said frame in a vertical plane passing through said frame.

7. A rotor supported kite comprising a longitudinal frame, a pair of oppositely projecting outriggers comprising a resilient wire member secured to the forward portion of said frame and extending substantially equal distances on both sides thereof, each of said outriggers having a wind driven rotor rotatably mounted on the underside thereof on a generally downward extending axis at the extreme end of each, said outriggers each being subject to angular flexure under the influence of thrust forces of its respective rotor, a connection for securing flexible tow means at the forward portion of said frame, a stabilizing plane structure disposed on said frame rearwardly of said outriggers comprising a pair of oppositely extending planar members, extending angularly downward from said frame.

References Cited in the file of this patent

UNITED STATES PATENTS

| | | |
|---|---|---|
| 2,460,959 | Wills | Feb. 8, 1949 |
| 2,472,290 | Fernstrum | June 7, 1949 |
| 2,518,768 | Fugate | Aug. 15, 1950 |
| 2,675,199 | Aylor | Apr. 13, 1954 |
| 2,763,958 | Lemelson | Sept. 25, 1956 |

FOREIGN PATENTS

| | | |
|---|---|---|
| 344,275 | Great Britain | Mar. 5, 1931 |